Nov. 5, 1968          B. H. SCOTT          3,408,695
                    FOAM CUSHION MOLD
Filed March 31, 1966                    4 Sheets-Sheet 1
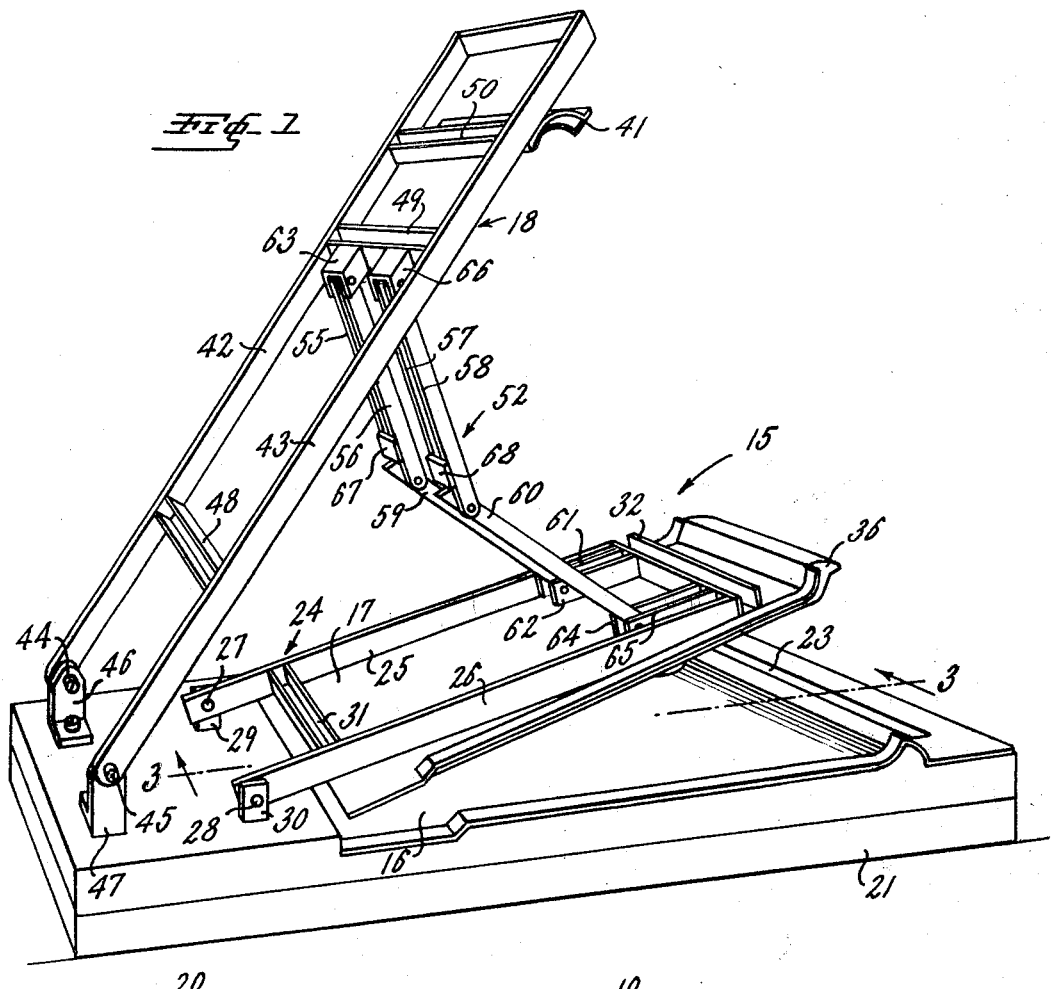
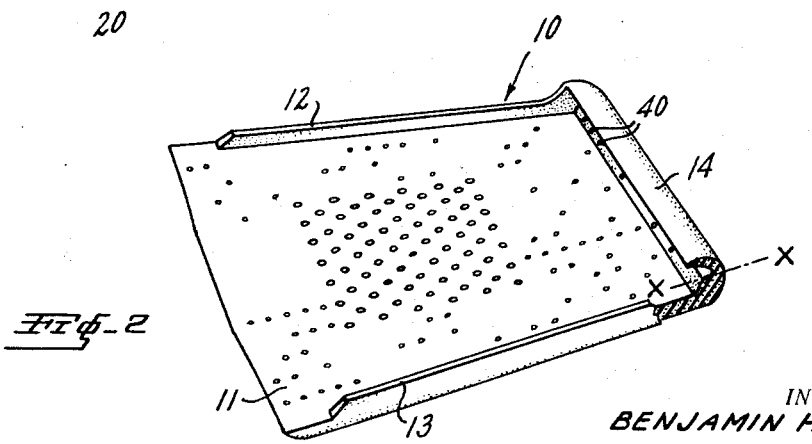
INVENTOR.
BENJAMIN H. SCOTT
BY *James R. Hulen*
ATTORNEY

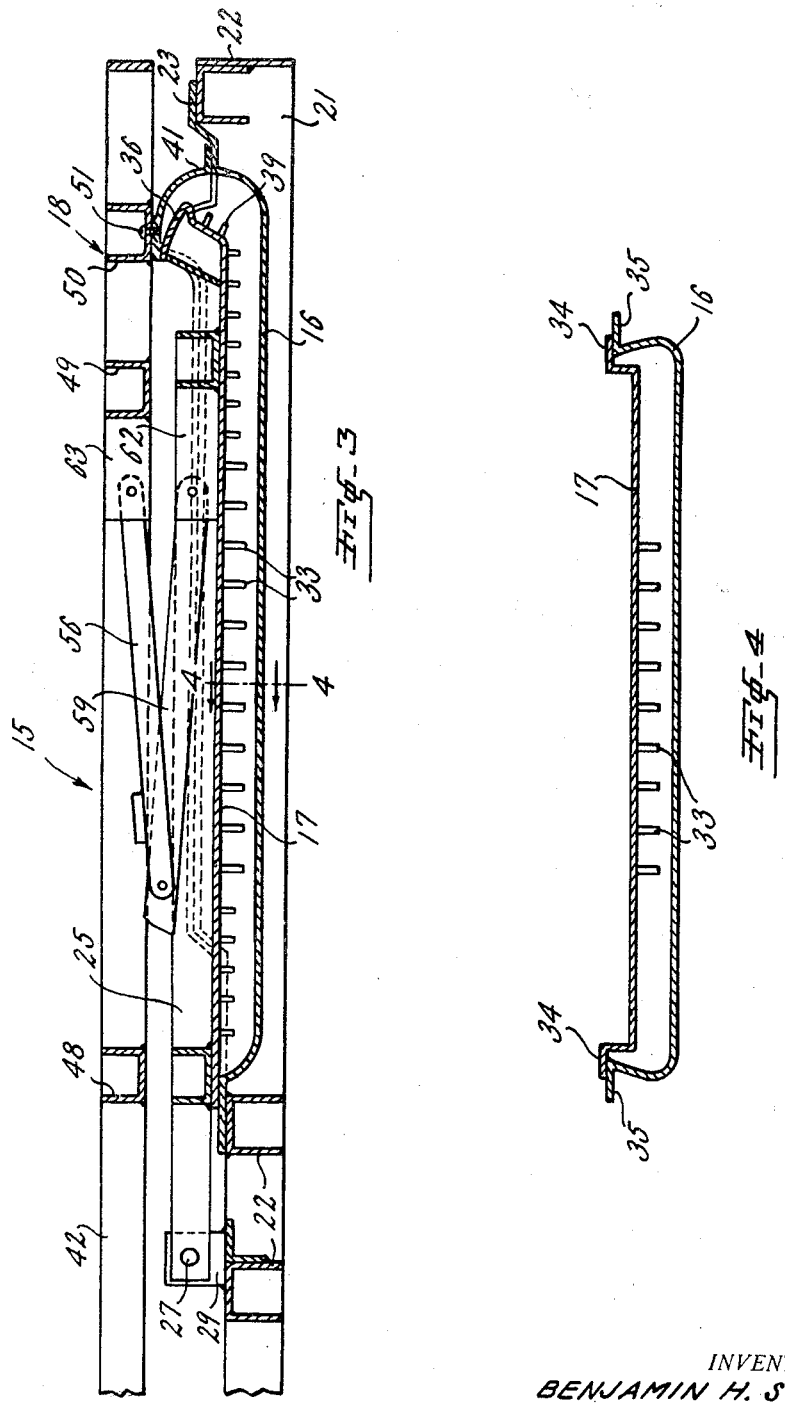

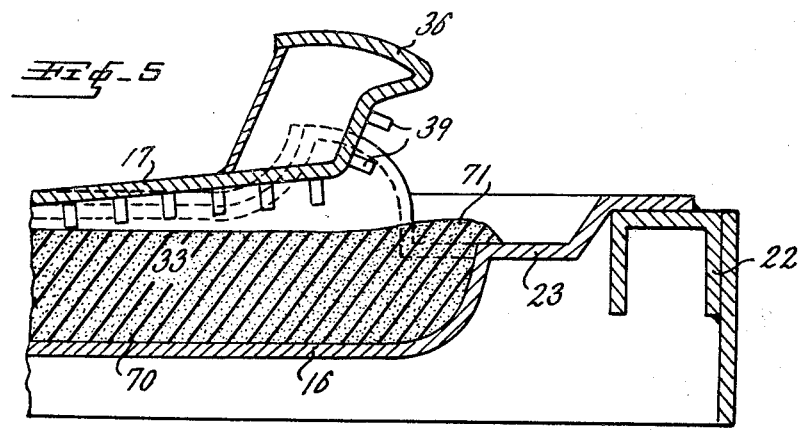
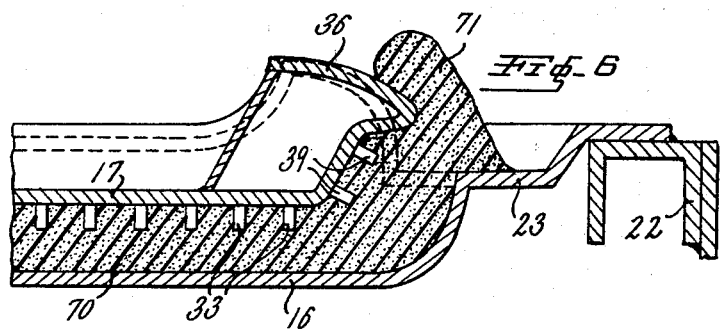
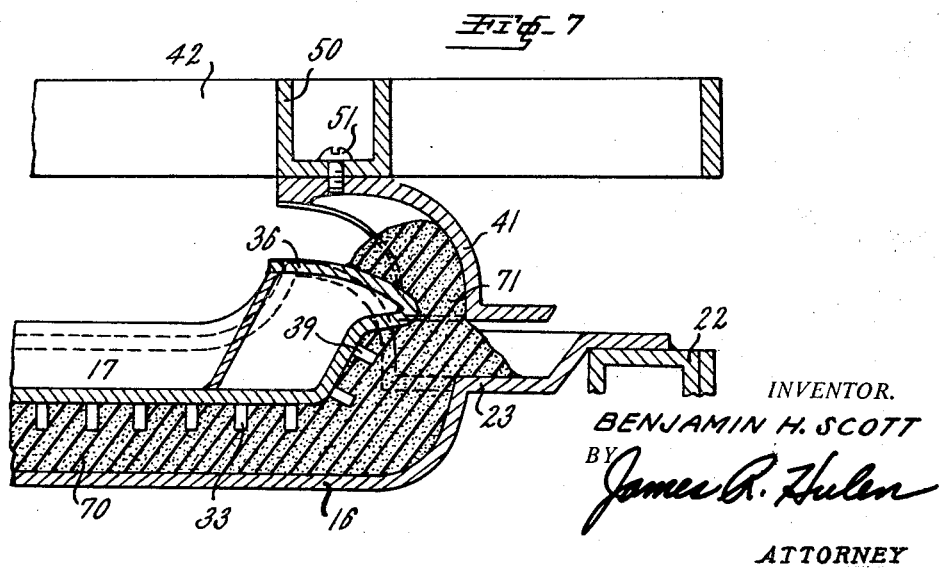

Nov. 5, 1968   B. H. SCOTT   3,408,695
FOAM CUSHION MOLD
Filed March 31, 1966   4 Sheets-Sheet 4

INVENTOR.
BENJAMIN H. SCOTT
BY James R. Hulen
ATTORNEY

United States Patent Office 3,408,695
Patented Nov. 5, 1968

3,408,695
FOAM CUSHION MOLD
Benjamin H. Scott, Mishawaka, Ind., assignor to Uniroyal, Inc., a corporation of New Jersey
Filed Mar. 31, 1966, Ser. No. 539,189
4 Claims. (Cl. 18—39)

This invention relates to an apparatus for making foam cushions, and, more particularly, to an apparatus for making a cushion having a foam body portion and an integral foam lip portion extending outwardly therefrom.

Prior cushions of the above-described type have been made by molding the foam body portion and foam lip portion separately and then cementing the two foam components together to make the desired article. Such fabrication procedures are costly, offer the possibility of misplacement of molded parts and result in hard cement lines which are not desirable. Furthermore, the exact amount of foam used in the manufacturing method is often difficult to judge and no provision has previously been made to salvage the excess foam or to make use thereof.

Accordingly, it is an object of this invention to provide a novel apparatus for making a cushion having a foam body portion and an integral foam lip extending outwardly therefrom.

A further object is to provide an apparatus for making a foam cushion wherein a predetermined amount of excess foam is utilized to make a portion of the cushion.

A still further object is to provide a mold assembly which greatly facilitates the removal of the molded cushions without damage to the cushions.

A still further object is to provide an apparatus for making a higher quality cushion at a greatly reduced cost.

The above and other objects are accomplished in accordance with this invention which comprises a molding assembly for making a foam cushion article having a body portion and an integral lip portion extending outwardly therefrom, which assembly comprises a lower mold for forming the body portion, a top cover plate for partially closing the mold, the plate having a first lip forming member spaced from the mold when the plate is in a closed position, so that, an opening is formed through which a predetermined amount of excess foam may pass, and a second lip forming member for closing the opening and cooperating with the first lip forming member to mold the lip portion from the excess foam.

The foam cushion article is made in accordance with the apparatus of the present invention by the steps of filling a lower mold with an amount of foam in excess of that required for making the body portion, partially closing the mold with a top cover plate having a first lip forming member thereon, the first lip forming member being spaced from the mold when the plate is in a closed position to form an opening between the mold and the first lip forming member through which the excess foam may pass, and subsequently closing the opening with a second lip forming member while entrapping the excess foam between the second lip forming member and the first lip forming member; whereby, the lip portion is formed integrally with the body portion.

For a better understanding of the present invention together with other and further objects thereof, reference is made to the following description, taken in connection with the accompanying drawings, and its scope will be pointed out in the appended claims.

Referring now to the drawings:

FIG. 1 is a side perspective view of the apparatus of the present invention with the top cover plate shown in the closed position;

FIG. 2 is a persepctive view of a foam cushion article made in accordance with the present invention with a portion thereof broken away for clarity;

FIG. 3 is a sectional view of the mold assembly taken along line 3—3 of FIG. 1 with the mold assembly parts shown in a closed position;

FIG. 4 is a sectional view taken along line 4—4 of FIG. 3;

FIG. 5 is a fragmentary sectional view showing the mold filled with foam and the top cover plate in a partially closed position;

FIG. 6 is a fragmentary sectional view showing the mold filled with foam and the top cover plate in a closed position;

FIG. 7 is a fragmentary sectional view similar to FIG. 6 with the second lip forming member partially in position;

Figure 8:
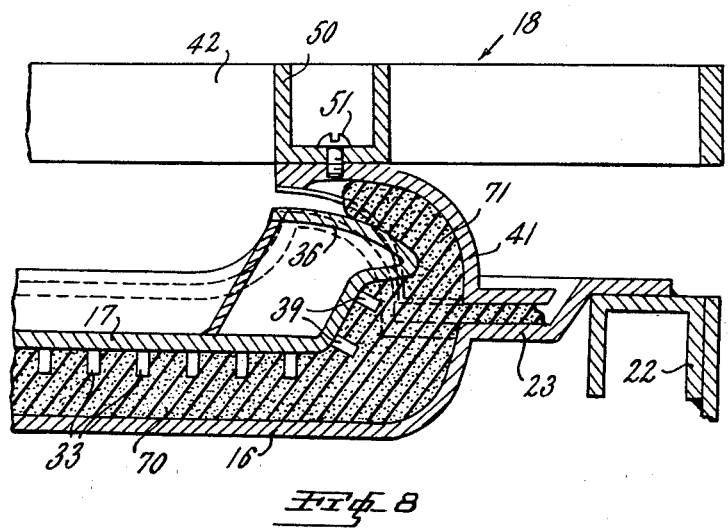
FIG. 8 is a fragmentary sectional view similar to FIG. 7 showing the second lip forming member in a more nearly closed position.

Referring to FIG. 2, a foam cushion article made in accordance with the present invention is shown generally at 10. Cushion 10 comprises a body portion 11 which is somewhat similar to prior art cushions in that it is generally flat and has a plurality of openings formed by cores in a mold surface. Cushion 10, which is intended for use as an automobile cushion, is provided with depending flanges 12 and 13 which increase the ease of installation and provide a rounded surface at the edges of the cushion.

In addition to body portion 11, cushion 10 is provided with a projecting lip portion 14, which lip extends outwardly and backwardly in relation to the body portion 11. Heretofore, body portion 11 and lip portion 14 were molded as individual units and cemented together to form a unitary cushion. The equipment and method for molding the body portion 11 and lip portion 14 as a single unit is the subject matter of this invention and will be described in detail hereinbelow.

Referring to FIGS. 1, 3 and 4, the mold assembly is shown generally at 15. Mold assembly 15 is made up of three basic members, the lower mold 16, the top cover plate 17 and the mold closing unit 18.

Lower mold 16 (see FIG. 3) is essentially a pan-shaped member for receiving prefrothed latex foam and shaping the foam to form the body portion 11 of the cushion 10. Mold 16 is secured to a framework 20 which is constructed from longitudinal members 21 and transverse channels 22. The forward edge of mold 16 has a stepped member 23 secured thereto which forms a seat for a mold closing element to be later described.

Top plate 17 is secured to a framework 24 which is mounted atop frame 20 for pivotal movement toward and away from mold 16. Plate 17 is shown in an "open" position in FIG. 1 and in a "closed" position in FIGS. 3 and 4. Referring to FIG. 1, framework 24 comprises a pair of longitudinal beams 25 and 26 which are secured along their length to the upper side of plate 17 and are pivotally supported at one end by pivot pins 27 and 28, respectively. Pins 27 and 28 are supported by blocks 29 and 30, respectively, which blocks are secured to the upper portion of frame 20. Transverse channels 31 and 32 provide additional support for framework 24.

Referring to FIG. 3, top cover plate 17, which is shown in the "closed" position, has a plurality of cores 33 extending downwardly from the lower surface thereof, which cores extend into the foam to form openings in the surface thereof. Flanges 34 extend outwardly along the sides of plate 17 and form a seal, when in the closed position, against flanges 35 which extend outwardly from mold 16 (see FIG. 4).

The forward end of top cover plate 17 (as viewed at the right in FIG. 3) has a first lip forming member 36 secured thereto. Member 36 extends outwardly and rearwardly of top cover plate 17 and is spaced from the stepped member 23 which is secured to mold 16. Member 36 also has cores 39 extending outwardly therefrom, which cores form the openings 40 in lip portion 14 (see FIG. 2). Since lip forming member 36 is spaced from member 23, top cover plate 17 does not completely close mold 16 when in the down or "closed" position. As a result of the spacing between members 23 and 36, an opening is formed across the entire right hand portion of mold 16 as viewed in FIGS. 1 and 3.

The primary function of mold closing unit 18 is to support and properly position the second lip forming member 41. Unit 18 is constructed much the same as framework 24 with two longitudinally extending beams 42 and 43 pivotally supported atop frame 20 by pivot pins 44 and 45, respectively. Pins 44 and 45 are, in turn, secured in position by blocks 46 and 47, respectively. Transverse channels 48, 49 and 50 add additional support to unit 18. The second lip forming member 41 is secured to transverse channel 50 by a plurality of screws, one of which is shown at 51 (see FIG. 3).

A connecting linkage shown generally at 52 is provided between top cover plate 17 and unit 18 to provide better alignment and more rapid opening of the mold assembly. Linkage 52 is constructed of a plurality of links 55, 56, 57, 58, 59 and 60. Link 59 is pivotally supported at one end between blocks 61 and 62 which are secured to top plate 17, and at its other end between links 55 and 56. Links 55 and 56 are pivotally supported at their other ends by block 63 which is secured to cross channel 49 on unit 18.

In like manner, link 60 is pivotally supported at one end between blocks 64 and 65, which blocks are secured to plate 17, and link 60 is pivotally supported at its other end between links 57 and 58 which are, in turn, pivotally supported to cross channel 49 by block 66. A pair of stops 67 and 68 are provided to prevent the linkage from folding beyond a desired limit.

Having thus described the apparatus, the method of operation shall now be described in detail. Referring to FIGS. 5 to 9, the extreme end portion of mold 16 (which portion appears on the right in FIGS. 1 and 3) is shown in enlarged views to illustrate the details of the present invention.

In FIG. 5, mold 16 is shown completely filled with prefrothed latex foam 70. Top cover plate 17 is shown in a position of descent wherein a number of cores 33 have contacted foam 70 and an excess portion 71 of the foam is being forced from the mold cavity at the location in which member 36 fails to make contact with member 23. In the FIG. 6 view, top plate 17 has reached the full extent of its downward travel and can be said to be in the "closed" position. This position is also illustrated in FIG. 4 wherein flanges 34 on top plate 17 are in full contact with flanges 35 on mold 16. This condition takes place along the two sides and the rearwardmost portion of mold 16 (as viewed at the left in FIG. 1 and FIG. 3) and furnishes a seal around the three sides of the mold. Since the first lip forming member 36 on top cover plate 17 does not contact member 23, an opening is formed between the two members through which the predetermined amount of foam is forced as the top plate reaches its lower extremity. This is illustrated by the large hump of excess foam 71 that appears in FIG. 6. Because of the consistency of frothed latex foam, excess foam 71 has a natural tendency to form a hump directly adjacent lip forming member 36.

Referring to FIG. 7, the next operational step of the present invention is to lower unit 18 into position over the other mold components. Unit 18 is pivoted downwardly and the second lip forming member 41 is brought into contact with lip forming member 36 and member 23. FIG. 8 represents a subsequent step wherein unit 18 is moved downwardly to a position closer to the other mold components and excess foam 71 is entrapped between lip forming member 36 and lip forming member 41.

Figure 9:
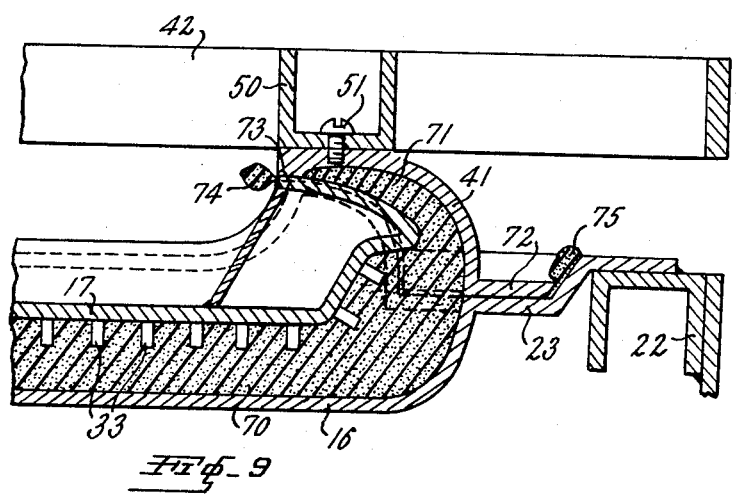
FIG. 9 is a fragmentary sectional view showing the mold assembly in an entirely closed position.

Referring to FIG. 9, the final step in the operation is illustrated wherein a flange 72 on lip forming member 41 is in intimate contact with a portion of stepped member 23 on mold 16 to form a seal across the entire forward portion of the mold. A depending lug 73 formed on the rearward end of lip forming member 41 contacts the upper portion of lip forming member 36 to form a transverse seal to completely entrap excess foam 71 between the two lip forming members and to form a projecting foam lip which is integral with body portion 11 formed in the main portion of mold 16. A small portion of unnecessary flash is expelled at 74 and 75 to vent the mold and form a smooth integral lip portion.

The cushion article is cured directly in the mold assembly and may be removed therefrom by pivoting unit 18 in a counterclockwise direction as viewed in FIGS. 1 and 3, which pivotal action results in a raising of top cover plate 17 when linkage 52 has reached its full extent.

Although this invention has been described as being particularly useful in the manufacture of latex foam articles, the unique mold construction also has value in the molding of foam-in-place materials, such as, polyurethane foam. When used with such materials, the foam is first placed in the lower mold 16 and then the top cover plate 17 and mold closing unit 18 are closed. Subsequent foaming of the material causes the foam to expand and fill mold 16. As in the case of the latex foam, a predetermined amount of foam, in excess of that necessary to form the body portion 11 of the cushion, expands through the opening between member 23 and member 36 and fills the cavity formed between lip forming members 36 and 41.

After the cushion is cured, it may be removed from the mold assembly. The unique construction of the lip forming members permits the rapid removal of the cushion without causing damage thereto.

It will be apparent from the foregoing description that a new apparatus has been provided, which apparatus provides a rapid and inexpensive means for manufacturing a cushion having a foam body portion and an integral foam lip portion extending outwardly therefrom.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letter Patent is:

1. A mold assembly for making a foam cushion article having a body portion and an integral lip portion extending outwardly therefrom, comprising: a lower mold for forming said body portion; a top cover plate for partially closing said mold, said plate having a first lip forming member spaced from said mold when said plate is in a closed position, so that, an opening is formed through which a predetermined amount of excess foam may pass; and a second lip forming member for closing said opening and cooperating with said first lip forming member to mold said lip portion from said excess foam.

2. The mold assembly of claim 1 further comprising means for supporting said top cover plate for pivotal movement toward and away from said blower mold.

3. The mold assembly of claim 2 further comprising a pivotally mounted mold closing unit for supporting and positioning said second lip forming member; and means interconnecting said top cover plate and said mold closing unit.

4. The mold assembly of claim 3 wherein said interconnecting means is a linkage which moves said plate to an open position subsequent to the removal of said second lip forming member, thereby, preventing damage to said foam lip portion.

References Cited

UNITED STATES PATENTS

| | | | |
|---|---|---|---|
| 2,119,291 | 5/1938 | Riesen | 264—299 X |
| 2,310,830 | 2/1943 | Blair et al. | 249—142 |
| 2,351,529 | 6/1944 | Luxenberger et al. | 18—39 |
| 2,574,915 | 11/1951 | Fuller | 264—299 X |
| 2,707,804 | 5/1955 | Thornburg | 18—39 |
| 2,804,650 | 9/1957 | Kunce | 18—39 X |
| 3,056,168 | 10/1962 | Terry | 249—142 X |
| 3,204,016 | 8/1965 | Sanger et al. | 18—36 X |
| 3,239,584 | 3/1966 | Terry et al. | 18—36 X |
| 3,261,897 | 7/1966 | Munk. | |
| 3,291,873 | 12/1966 | Eakin | 18—39 X |

J. HOWARD FLINT, Jr., *Primary Examiner.*